United States Patent
Salz

(10) Patent No.: US 7,556,311 B2
(45) Date of Patent: Jul. 7, 2009

(54) ROOF FOR A MOTOR VEHICLE

(75) Inventor: Wolfram Salz, Sachsenheim (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 329 days.

(21) Appl. No.: 11/620,265

(22) Filed: Jan. 5, 2007

(65) Prior Publication Data
US 2007/0152470 A1 Jul. 5, 2007

(30) Foreign Application Priority Data
Jan. 5, 2006 (DE) .................. 10 2006 000 849

(51) Int. Cl.
B60J 7/047 (2006.01)

(52) U.S. Cl. ............... 296/220.01; 296/121; 296/107.2; 296/216.04

(58) Field of Classification Search ................ 296/121, 296/107.16, 107.17, 107.2, 215, 220.01, 296/216.03, 216.02, 216.04, 216.05
See application file for complete search history.

(56) References Cited

U.S. PATENT DOCUMENTS

| 4,081,194 | A | * | 3/1978 | Jardin .................. 296/217 |
| 5,058,947 | A | * | 10/1991 | Huyer .................. 296/216.03 |
| 5,765,908 | A | * | 6/1998 | Kelm .................. 296/223 |
| 5,941,598 | A | | 8/1999 | Cave et al. |
| 6,053,568 | A | | 4/2000 | Jambor |
| 6,056,352 | A | | 5/2000 | Ewing et al. |
| 6,158,803 | A | | 12/2000 | Reihl et al. |
| 6,502,898 | B1 | | 1/2003 | Salz |
| 6,652,022 | B2 | | 11/2003 | Pfalzgraf et al. |
| 6,729,684 | B2 | | 5/2004 | Arnold et al. |
| 6,893,083 | B2 | | 5/2005 | Engl |
| 7,229,126 | B2 | | 6/2007 | Seifert |
| 7,374,236 | B2 | * | 5/2008 | Striegel et al. ......... 296/220.01 |
| 2002/0163227 | A1 | | 11/2002 | Pfalzgraf et al. |
| 2003/0011215 | A1 | | 1/2003 | Arnold et al. |
| 2004/0041441 | A1 | * | 3/2004 | Engl ..................... 296/216.03 |
| 2005/0146164 | A1 | | 7/2005 | Seifert |
| 2007/0075571 | A1 | * | 4/2007 | Striegel et al. ......... 296/220.01 |
| 2007/0152470 | A1 | * | 7/2007 | Salz ..................... 296/108 |

FOREIGN PATENT DOCUMENTS

| DE | 37 25 982 A1 | 2/1989 |
| DE | 299 12 148 U1 | 10/1999 |
| DE | 199 27 654 C1 | 7/2000 |
| EP | 1 236 601 A1 | 9/2002 |
| EP | 1 275 541 A1 | 1/2003 |
| EP | 1 295 744 A1 | 3/2003 |
| EP | 1 541 399 A1 | 6/2005 |
| GB | 2 147 943 A | 5/1985 |
| WO | WO-96/26081 A1 * | 8/1996 |

* cited by examiner

Primary Examiner—Jason S Morrow
(74) Attorney, Agent, or Firm—Brooks Kushman P.C.

(57) ABSTRACT

A passenger vehicle roof includes front and rear roof parts. The front roof part is longitudinally slidable. The front roof part cooperates with the rear roof part via a control lever such that upon an opening longitudinal motion of the front roof part the control lever lowers the rear roof part in a forcibly guided manner and upon a closing longitudinal motion of the front roof part the control lever raises the rear roof part.

15 Claims, 1 Drawing Sheet

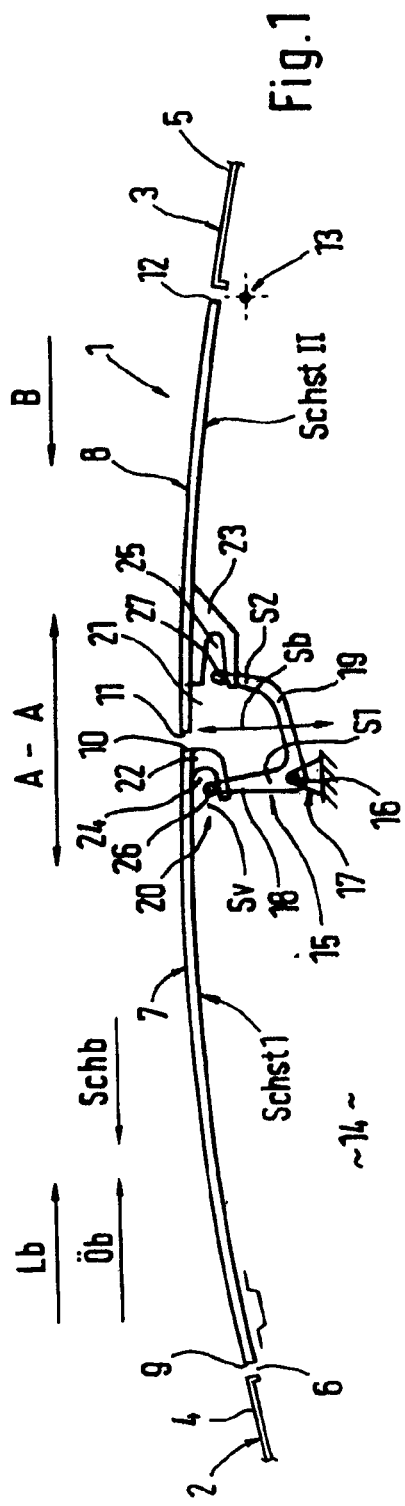
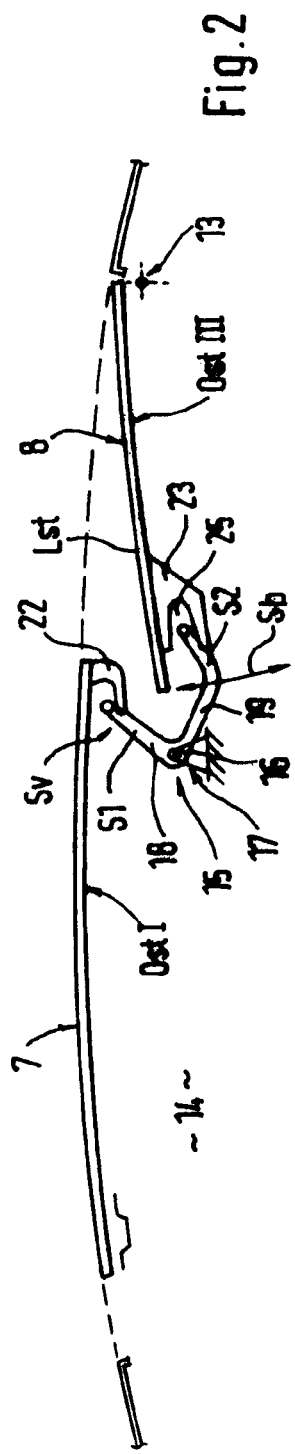
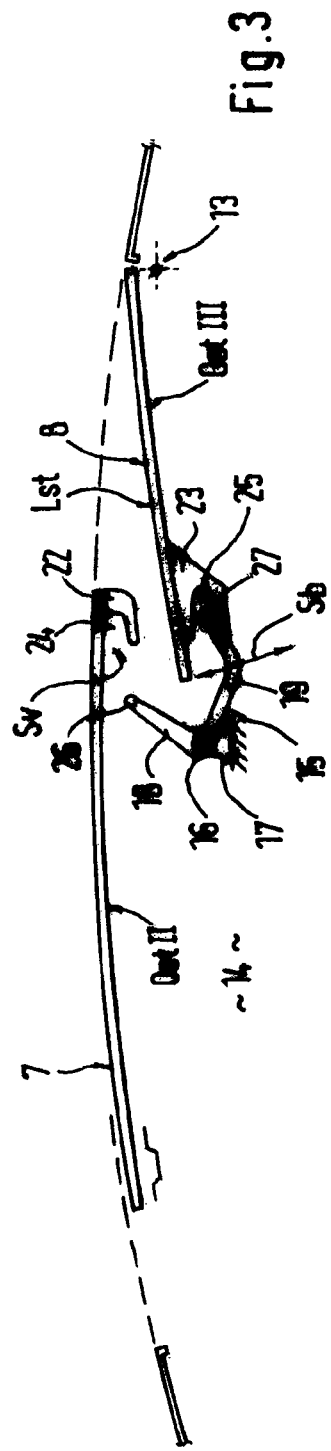

ROOF FOR A MOTOR VEHICLE

CROSS-REFERENCE TO RELATED APPLICATIONS

This application claims foreign priority benefits under 35 U.S.C. § 119(a)-(d) to DE 10 2006 000 849.9, filed Jan. 5, 2006, which is hereby incorporated by reference in its entirety.

BACKGROUND OF THE INVENTION

1. Field of the Invention

The present invention relates to motor vehicle roofs.

2. Background Art

DE 197 13 347 C1 (corresponding to U.S. Pat. No. 6,158, 803) describes a motor vehicle roof having three roof parts. These roof parts include a movable spoiler, a displaceable cover, and a fixed roof part. The cover is displaceable in the longitudinal direction of the vehicle. The cover cooperates with a lever while being displaced such that the cover is either raised or lowered to allow the cover to move over the fixed roof part in which the cover exposes the vehicle interior or back into a closed position in which the cover covers the vehicle interior.

DE 102 39 863 A1 (corresponding to U.S. Pat. No. 6,893, 083) describes a vehicle body having roof parts. One of the roof parts is a sliding roof part. The sliding roof part may be raised or lowered with insertion of a two-arm elbow lever. In the raised position of the sliding roof part, the elbow lever is guided in a fixed linkage on the vehicle body with one arm being vertical and the other arm assuming a horizontal position.

DE 37 25 982 C2 describes a station wagon vehicle having a roof opening which encloses two roof parts situated one behind the other. The front roof part is able to slide over the rear roof part. In an opened state, the front roof part rests at least in places above the rear roof part. A crank is used for raising and lowering the front roof part to allow the front roof part to slide over the rear roof part and back into the closed state.

SUMMARY OF THE INVENTION

An object of the present invention is a passenger vehicle roof having front and rear roof parts in which longitudinal motions of the front roof part cause the rear roof part to move between opened and closed positions.

Another object of the present invention is a passenger vehicle roof having front and rear roof parts in which longitudinal motion of the front roof part in an opening direction from a closed state of the roof parts causes the rear roof part to swivel to an opened position in which the rear roof part is tilted downward toward the vehicle interior to expose the vehicle interior and a portion of the front roof part lies above the rear roof part to further expose the vehicle interior; and in which longitudinal motion of the front roof part in an opposite closing direction from an opened state of the roof parts causes the rear roof part to tilt upward to a closed position in which the front and rear roof parts lie one behind one another over the vehicle interior to cover the vehicle interior.

A further object of the present invention is a passenger vehicle roof having front and rear roof parts and a control lever in which the roof parts cooperate with the control lever such that longitudinal motions of the front roof part causes the rear roof part to tilt upward and downward relative to the longitudinal motions of the front roof part.

Another object of the present invention is a passenger vehicle roof having front and rear roof parts disconnectably connected to one another such that longitudinal motions of the front roof part causes the rear roof part to tilt upward and downward relative to the longitudinal motions of the front roof part.

In carrying out the above objects and other objects, the present invention provides a roof for a vehicle. The roof includes a lever, a front roof part, and a rear roof part. The front roof part is longitudinally slidable. The front roof part cooperates with the rear roof part via the lever such that upon an opening longitudinal motion of the front roof part the lever lowers the rear roof part in a forcibly guided manner and upon a closing longitudinal motion of the front roof part the lever raises the rear roof part.

Further, in carrying out the above objects and other objects, the present invention provides a roof for a vehicle. The roof includes a lever, a front roof part, and a rear roof part. The lever is movable about an axis point in opposite first and second swivel directions. The front roof part is movable in opposite opening and closing longitudinal directions. The front roof part is connectable to the lever and is disconnectable from the lever. The rear roof part is movable in opposite opening and closing pivot directions generally perpendicular to the opening and closing longitudinal directions of the front roof part. The rear roof part is connected to the lever such that the rear roof part moves in the opening pivot direction when the lever moves in the first swivel direction and such that the rear roof part moves in the closing pivot direction when the lever moves in the second swivel direction. The front roof part moves the lever in the first swivel direction when moving in the opening longitudinal direction while connected to the lever such that the rear roof part moves in the opening pivot direction until the front roof part disconnects from the lever. The front roof part moves the lever in the second swivel direction when moving in the closing longitudinal direction upon connecting to the lever such that the rear roof part moves in the closing pivot direction.

Also, in carrying out the above objects and other objects, the present invention provides a roof for a vehicle. The roof includes a lever, a front roof part, and a rear roof part. The lever is movable about a first axis point in opposite first and second swivel directions. The front roof part is movable about a second axis point in opposite opening and closing longitudinal directions. The front roof part has a front border and a rear border. The front roof part is connectable to the lever and is disconnectable from the lever. The rear roof part is movable in opposite opening and closing pivot directions generally perpendicular to the opening and closing longitudinal directions of the front roof part. The rear roof part has a front border and a rear border. The rear roof part is connected to the lever such that the rear roof part moves in the opening pivot direction when the lever moves in the first swivel direction and such that the rear roof part moves in the closing pivot direction when the lever moves in the second swivel direction. The front roof part moves the lever in the first swivel direction when moving in the opening longitudinal direction while connected to the lever such that the rear roof part moves in the opening pivot direction until the front roof part disconnects from the lever and the rear border of the front roof part lies above the front border of the rear roof part. The front roof part moves the lever in the second swivel direction when moving in the closing longitudinal direction upon connecting to the lever such that the rear roof part moves in the closing pivot direction and the rear border of the front roof part lies flush to the front border of the rear roof part in a generally common plane.

In accordance with an embodiment of the present invention, the front roof part undergoes longitudinal motions and the rear roof part undergoes corresponding swivel (tilt) motions. The control lever is fixedly supported on the vehicle body and engages both the front and rear roof parts. In this manner, when the front roof part is displaced a forcibly guided swivel motion of the rear roof part is achieved without additional motor-driven means for the rear roof part. The control lever includes a simple two-armed lever which by control pins engages with retainers in the roof parts. The design of the control lever and the retainers allows a functionally correct control of the roof parts with respect to one another.

The above features, and other features and advantages of the present invention as readily apparent from the following detailed descriptions thereof when taken in connection with the accompanying drawings.

BRIEF DESCRIPTION OF THE DRAWINGS

A motor vehicle roof having movable roof parts in accordance with an exemplary embodiment of the present invention is shown in the drawings in which:

FIG. 1 illustrates a longitudinal section of the roof in which the roof parts are in a closed position;

FIG. 2 illustrates a longitudinal section of the roof in which the roof parts are in a first opened position; and FIG. 3 illustrates a longitudinal section of the roof in which the roof parts are in a second opened position.

DETAILED DESCRIPTION OF THE PREFERRED EMBODIMENT(S)

Referring now to FIGS. 1, 2, and 3, a roof 3 for a passenger vehicle 1 in accordance with an embodiment of the present invention is shown. Roof 3 includes a front roof part 7 and a rear roof part 8. Front roof part 7 is situated along a front portion of vehicle 1 along the longitudinal direction A-A of vehicle 1. Rear roof part 8 is situated along a rear portion of vehicle 1 along the longitudinal vehicle direction A-A. Roof parts 7, 8 are movable as will be described in greater detail herein.

In general, FIG. 1 illustrates a longitudinal section of roof 3 in which roof parts 7, 8 are in a closed position. In the closed position, roof parts 7, 8 lie one behind one another in a general common plane over the entire vehicle interior with rear roof part 8 behind front roof part 7 to cover the entire vehicle interior. FIG. 2 illustrates a longitudinal section of roof 3 in which roof parts 7, 8 are in a first opened position. In the first opened position, the front portion of rear roof part 8 is titled downward toward the vehicle interior to expose the surrounding area of the vehicle interior and front roof part 7 is longitudinally moved toward the space vacated by the titled front portion of rear roof part 8 such that a rear portion of front roof part 7 lies above the titled front portion of rear roof part 8 and a front portion of the vehicle interior is exposed by front roof part 7. FIG. 3 illustrates a longitudinal section of roof 3 in which roof parts 7, 8 are in a second opened position. In the second opened position, the front portion of rear roof part 8 remains tilted downward toward the vehicle interior to expose the surrounding area of the vehicle interior and front roof part 7 is longitudinally moved further toward the space vacated by the tilted front portion of rear roof part 8 such that a larger rear portion of front roof part 7 lies above the tilted front portion of rear roof part 8 and a larger front portion of the vehicle interior is exposed by front roof part 7.

More particularly, FIG. 1 illustrates roof parts 7, 8 in the closed position in which front roof part 7 is in a first closed position Schst I and rear roof part 8 is in a second closed position Schst II such that roof parts 7, 8 lie one behind one another in a general common plane over the entire vehicle interior with rear roof part 8 behind front roof part 7 to cover the entire vehicle interior. FIG. 2 illustrates roof parts 7, 8 in the first opened position in which front roof part 7 is in a first opened position Ost I and rear roof part 8 is in an opened position Ost III. In the opened position Ost III, the front portion of rear roof part 8 is titled downward toward the vehicle interior to expose the surrounding area of the vehicle interior. In the first opened position Ost I, front roof part 7 is longitudinally moved toward the space vacated by the titled front portion of rear roof part 8 such that a rear portion of front roof part 7 lies above the titled front portion of rear roof part 8 and a front portion of the vehicle interior is exposed by front roof part 7. FIG. 3 illustrates roof parts 7, 8 in the second opened position in which front roof part 7 is in a second opened position Ost II and rear roof part 8 is in the opened position Ost III. In the second opened position Ost II, front roof part 7 is longitudinally moved further toward the space vacated by the tilted front portion of rear roof part 8 such that a larger rear portion of front roof part 7 lies above the tilted front portion of rear roof part 8 and a larger front portion of the vehicle interior is exposed by front roof part 7.

Vehicle 1 includes a vehicle body 2 having a roof opening 6. Roof opening 6 is bordered in the front area of vehicle 1 by a front vehicle body element 4. Roof opening 6 is bordered in the rear area of vehicle 1 by a rear vehicle body element 5. Vehicle body elements 4, 5 may be made of transparent glass.

Front and rear roof parts 7, 8 are situated within roof opening 6. Front and rear roof parts 7, 8 may also be made of transparent glass.

Front roof part 7 includes a front border 9 and a rear border 10. Front border 9 of front roof part 7 faces front vehicle body element 4. Via an electric motor, hydraulic motor, or the like, front roof part 7 moves along the longitudinal vehicle direction A-A in the manner of a sliding roof. As such, front roof part 7 moves via longitudinal motions Lb from the first closed position Schst I to the first opened position Ost I, and from the first opened position Ost I to the second opened position Ost II. Likewise, front roof part 7 moves via longitudinal motions Schb from the second opened position Ost II to the first opened position Ost I, and from the first opened position Ost I to the first closed position Schst I.

Rear roof part 8 includes a front border 11 and a rear border 12. Rear border 10 of front roof part 7 and front border 11 of rear roof part 8 face one another and lie flush together when roof parts 7, 8 are in the respective closed positions Schst I and Schst II. Front border 11 of rear roof part 8 is able to undergo swivel (tilted) motions Sb about a rotational axis 13. Rotational axis 13 is aligned transversely to the longitudinal vehicle direction A-A and is situated adjacent to rear border 12 of rear roof part 8.

Because of the articulated joint of rear roof part 8, rear roof part 8 moves via swivel motions Sb between the second closed position Schst II and the opened position Ost III. That is, rear roof part 8 is moved via a downward swivel motion from the closed position Schst II to the opened position Ost III. The downward swivel motion Sb is generally perpendicular to the longitudinal motions Lb of front roof part 7 and is directed downward toward the vehicle interior. Likewise, rear roof part 8 is moved via an upward swivel motion from the opened position Ost III to the closed position Schst II. The upward swivel motion Sb is generally perpendicular to the longitudinal motions Lb of front roof part 7 and is directed upward away from the vehicle interior. The opened position Ost III of rear roof part 8 corresponds to rear roof part 8 in a ventilation position Lst for a passenger compartment 14 in vehicle body 2. In the ventilation position Lst, front border 11 of rear roof part 8 is titled downward toward the vehicle interior to expose the surrounding area of the vehicle interior.

A control lever 15 disconnectably connects front and rear roof parts 7, 8 to one another. More particularly, control lever 15 disconnectably connects rear border 10 of front roof part 7 to front border 11 of rear roof part 8. Control lever 15 acts between front and rear roof parts 7, 8 such that control lever 15 initiates swivel motions Sb of rear roof part 8 as a function of the longitudinal motions Lb of front roof part 7.

Control lever 15 is a two-armed lever having first and second lever arms 18, 19. Lever arms 18, 19 are attached at their respective fixed ends to a fixed bearing 17 on vehicle body 2 by a swivel axis 16. First lever arm 18 cooperates at its free end 20 with a first retainer 22 of front roof part 7. First retainer 22 is attached to rear border 10 of front roof part 7. Second lever arm 19 cooperates at its free end 21 with a second retainer 23 of rear roof part 8. Second retainer 23 is attached to front border 11 of rear roof part 8. As such, first retainer 22 adjoins rear border 10 of front roof part 7, and second retainer 23 adjoins front border 11 of rear roof part 8.

First retainer 22 includes an oval or slot-like linkage 24. A control pin 26 on free end 20 of first lever arm 18 engages linkage 24. Likewise, second retainer 23 includes an oval or slot-like linkage 25. A control pin 27 on free end 21 of second lever arm 19 engages linkage 25.

First and second retainers 22, 23 are each open at a front side Sv as viewed in the direction of forward vehicle travel B. As such, in the opened position Ost III of rear roof part 8, a complete decoupling between control pin 26 of first lever arm 18 and first retainer 22 is made possible. For structural and kinematic reasons, control lever 15 has a U-shaped design in which legs S1 and S2 respectively form first and second lever arms 18, 19.

In a longitudinal opening motion Öb (i.e., longitudinal motion Lb) of front roof part 7 into one of the opened positions Ost I or Ost II, control lever 15 (i.e., lever arms 18, 19) swivels about swivel axis 16. This causes rear roof part 8 to be lowered by control lever 15 into the opened position Ost III via rotational axis 13 in a forcibly guided manner. In this position, first lever arm 18 and first retainer 22 are separated from one another, i.e., decoupled from one another. On the other hand, when front roof part 7 undergoes a longitudinal closing motion Schb (i.e., opposite to longitudinal motion Lb) rear roof part 8 is raised once again via control lever 15 and is brought into its closed position Schst II.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A roof for a vehicle, the roof comprising:
   a lever movable about an axis point in opposite first and second swivel directions;
   a front roof part movable in opposite opening and closing longitudinal directions, wherein the front roof part is connectable to the lever and is disconnectable from the lever; and
   a rear roof part movable in opposite opening and closing pivot directions generally perpendicular to the opening and closing longitudinal directions of the front roof part, wherein the rear roof part is connected to the lever such that the rear roof part moves in the opening pivot direction when the lever moves in the first swivel direction and such that the rear roof part moves in the closing pivot direction when the lever moves in the second swivel direction;
   wherein the front roof part moves the lever in the first swivel direction when moving in the opening longitudinal direction while connected to the lever such that the rear roof part moves in the opening pivot direction until the front roof part disconnects from the lever;
   wherein the front roof part moves the lever in the second swivel direction when moving in the closing longitudinal direction upon connecting to the lever such that the rear roof part moves in the closing pivot direction.

2. The roof of claim 1 wherein:
   the lever includes first and second arms, wherein the first lever arm connects to the front roof part and disconnects from the front roof part, wherein the second lever arm is connected to the rear roof part.

3. The roof of claim 2 wherein:
   each lever arm includes a free end and a fixed end, wherein each fixed end is connected to the axis point, wherein the free end of the first lever arm connects to the front roof part to connect the first lever arm to the front roof part and disconnects from the front roof part to disconnect the first lever arm from the front roof part, wherein the free end of the second lever arm is connected to the rear roof part to connect the second lever arm to the rear roof part.

4. The roof of claim 3 wherein:
   the front roof part includes a first retainer and the rear roof part includes a second retainer;
   wherein the free end of the first lever arm connects to the first retainer of the front roof part to connect the first lever arm to the front roof part and disconnects from the first retainer of the front roof part to disconnect the first lever arm from the front roof part;
   wherein the free end of the second lever arm is connected to the second retainer of the rear roof part to connect the second lever arm to the rear roof part.

5. The roof of claim 4 wherein:
   the front roof part includes a front border and a rear border, and the rear roof part includes a front border and a rear border;
   wherein the first retainer of the front roof part adjoins the rear border of the front roof part;
   wherein the second retainer of the rear roof part adjoins the front border of the rear roof part.

6. The roof of claim 5 wherein:
   the first retainer of the front roof part includes a first control linkage and the second retainer of the rear roof part includes a second control linkage;
   wherein the free end of the first lever arm includes a first control pin and the free end of the second lever arm includes a second control pin;
   wherein the first control pin of the free end of the first lever arm engages the first control linkage of the first retainer of the front roof part to connect the first lever arm to the front roof part, and the first control pin of the free end of the first lever arm disengages from the first control linkage of the first retainer of the front roof part to disconnect the first lever arm from the front roof part;
   wherein the second control pin of the free end of the second lever arm is engaged with the second control linkage of the second retainer of the rear roof part to connect the second lever arm to the rear roof part.

7. The roof of claim 6 wherein:
each control linkage has an oval shape.

8. The roof of claim 6 wherein:
the first retainer of the front roof part is open at a front side as viewed in the direction of forward vehicle travel.

9. The roof of claim 2 wherein:
the lever is U-shaped, the legs of which respectively form the lever arms.

10. The roof of claim 1 wherein:
the rear roof part includes a front border and a rear border;
wherein the rear roof part is supported on the vehicle body via a rotational axis adjoining the rear border of the rear roof part, and the front border of the rear roof part can be lowered in the direction of a passenger compartment of the vehicle interior.

11. A roof for a vehicle, the roof comprising:
a lever;
a front roof part, wherein the front roof part is longitudinally slidable; and
a rear roof part;
wherein the front roof part cooperates with the rear roof part via the lever such that upon an opening longitudinal motion of the front roof part the lever lowers the rear roof part in a forcibly guided manner and upon a closing longitudinal motion of the front roof part the lever raises the rear roof part;
wherein the lever decouples from the front roof part in an opened position of the front roof part.

12. A roof for a vehicle, the roof comprising:
a lever movable about an axis point in opposite first and second swivel directions;
a front roof part movable in opposite opening and closing longitudinal directions, the front roof part having a front border and a rear border, wherein the front roof part is connectable to the lever and is disconnectable from the lever; and
a rear roof part movable in opposite opening and closing pivot directions generally perpendicular to the opening and closing longitudinal directions of the front roof part, the rear roof part having a front border and a rear border, wherein the rear roof part is connected to the lever such that the rear roof part moves in the opening pivot direction when the lever moves in the first swivel direction and such that the rear roof part moves in the closing pivot direction when the lever moves in the second swivel direction;
wherein the front roof part moves the lever in the first swivel direction when moving in the opening longitudinal direction while connected to the lever such that the rear roof part moves in the opening pivot direction until the front roof part disconnects from the lever and the rear border of the front roof part lies above the front border of the rear roof part;
wherein the front roof part moves the lever in the second swivel direction when moving in the closing longitudinal direction upon connecting to the lever such that the rear roof part moves in the closing pivot direction and the rear border of the front roof part lies flush to the front border of the rear roof part in a generally common plane.

13. The roof of claim 12 wherein:
the lever includes first and second arms, wherein the first lever arm connects to the front roof part and disconnects from the front roof part, wherein the second lever arm is connected to the rear roof part.

14. The roof of claim 12 wherein:
the axis point of the lever is fixable to a vehicle body bearing.

15. The roof of claim 12 wherein:
the axis point defines a rotational axis transverse to the opening and closing longitudinal directions of the front roof part.

* * * * *